US008812390B1

(12) United States Patent
Zeng

(10) Patent No.: US 8,812,390 B1
(45) Date of Patent: Aug. 19, 2014

(54) SYSTEM AND METHOD FOR AN IMPLIED ALPHA MODEL AND INVESTOR PREFERENCES

(76) Inventor: Hong Zeng, Wellesley, MA (US)

( * ) Notice: Subject to any disclaimer, the term of this patent is extended or adjusted under 35 U.S.C. 154(b) by 0 days.

(21) Appl. No.: 13/537,371

(22) Filed: Jun. 29, 2012

(51) Int. Cl.
*G06Q 40/00* (2012.01)

(52) U.S. Cl.
USPC .......................................... 705/36 R; 705/35

(58) Field of Classification Search
CPC ...................................................... G06Q 40/00
USPC ...................................................... 705/36 R
See application file for complete search history.

(56) References Cited

U.S. PATENT DOCUMENTS

2010/0318472 A1* 12/2010 Falkenstein ................. 705/36 R
2011/0289017 A1* 11/2011 Renshaw .................... 705/36 R

* cited by examiner

*Primary Examiner* — Eric T Wong
*Assistant Examiner* — John Anderson
(74) *Attorney, Agent, or Firm* — Bay State IP, LLC

(57) ABSTRACT

The instant invention relates generally to a group of computer-based methods preferably utilized in an implied alpha model and investor preferences to detect and address a preference drag problem. The computer-based method starts with an implied alpha model, which is derived from an existing portfolio. An implied alpha model can be treated as a preference aggregation when its factors represent investors' preferences on the portfolio. In this case, the model is also called an implied preference model. After an implied preference model is developed from a portfolio, a drag problem can be detected by checking whether the model has persistent and negative returns. If a drag problem exists in a portfolio, it can be solved by modifying the portfolio under assistance from the model.

7 Claims, 6 Drawing Sheets

A Process to detect and solve a preference drag problem in a portfolio

FIG 1. A Process to detect and solve a preference drag problem in a portfolio
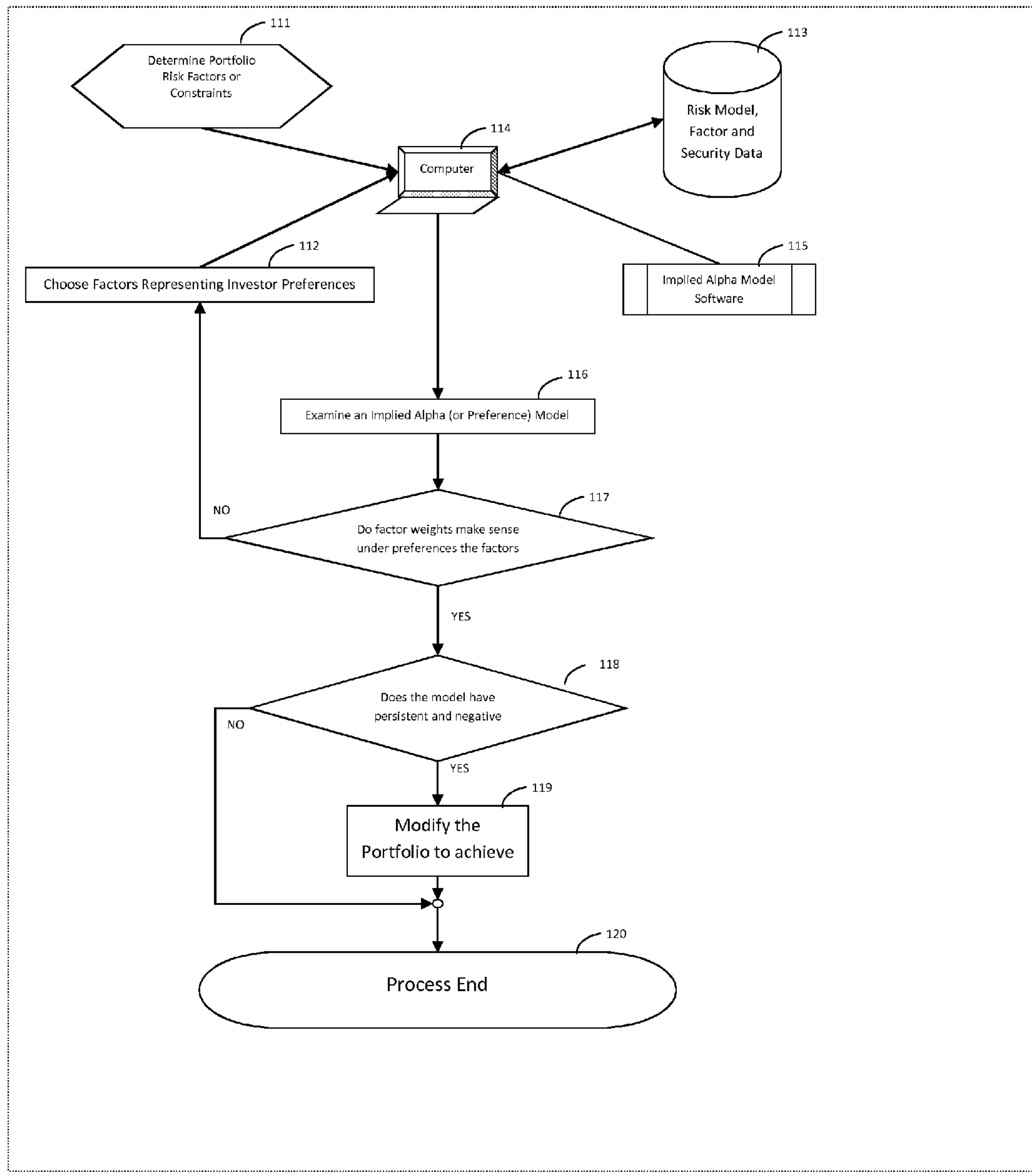

FIG. 2 A Process to Construct an Implied Alpha Model
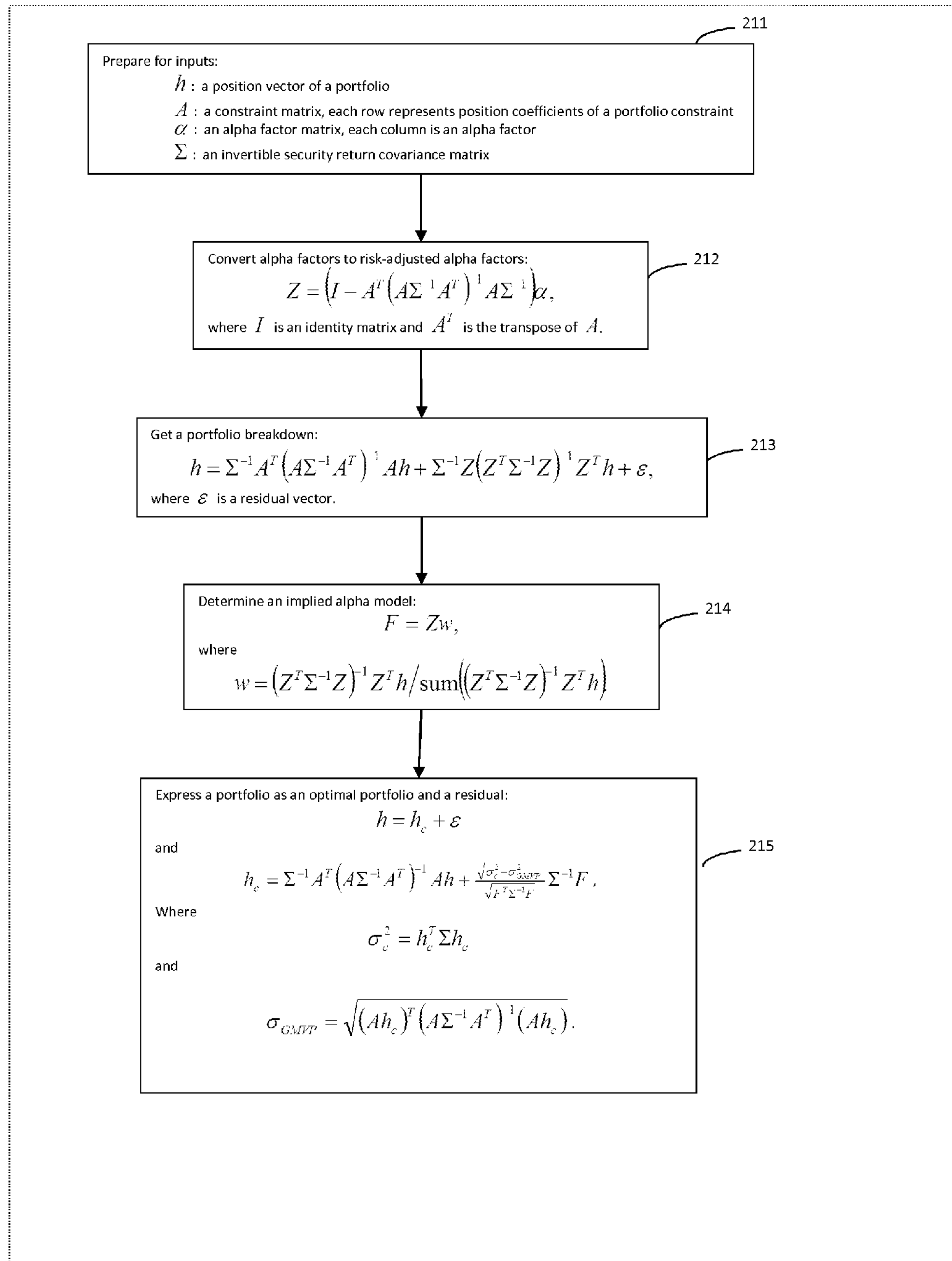

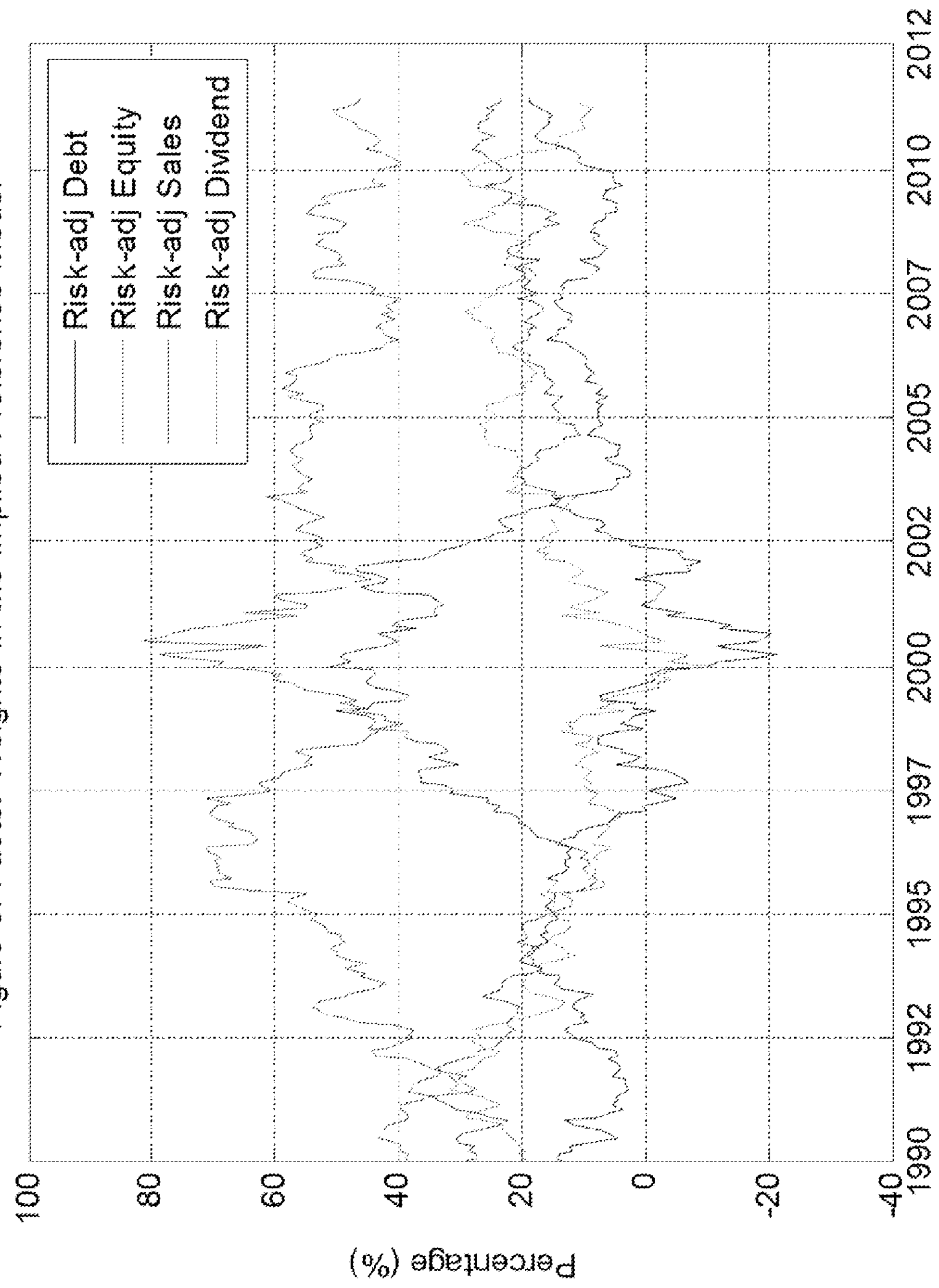
Figure 3. Factor Weights in the Implied Preference Model
Risk-adj Debt
Risk-adj Equity
Risk-adj Sales
Risk-adj Dividend
Percentage (%)
100
80
60
40
20
0
-20
-40
1990
1992
1995
1997
2000
2002
2005
2007
2010
2012

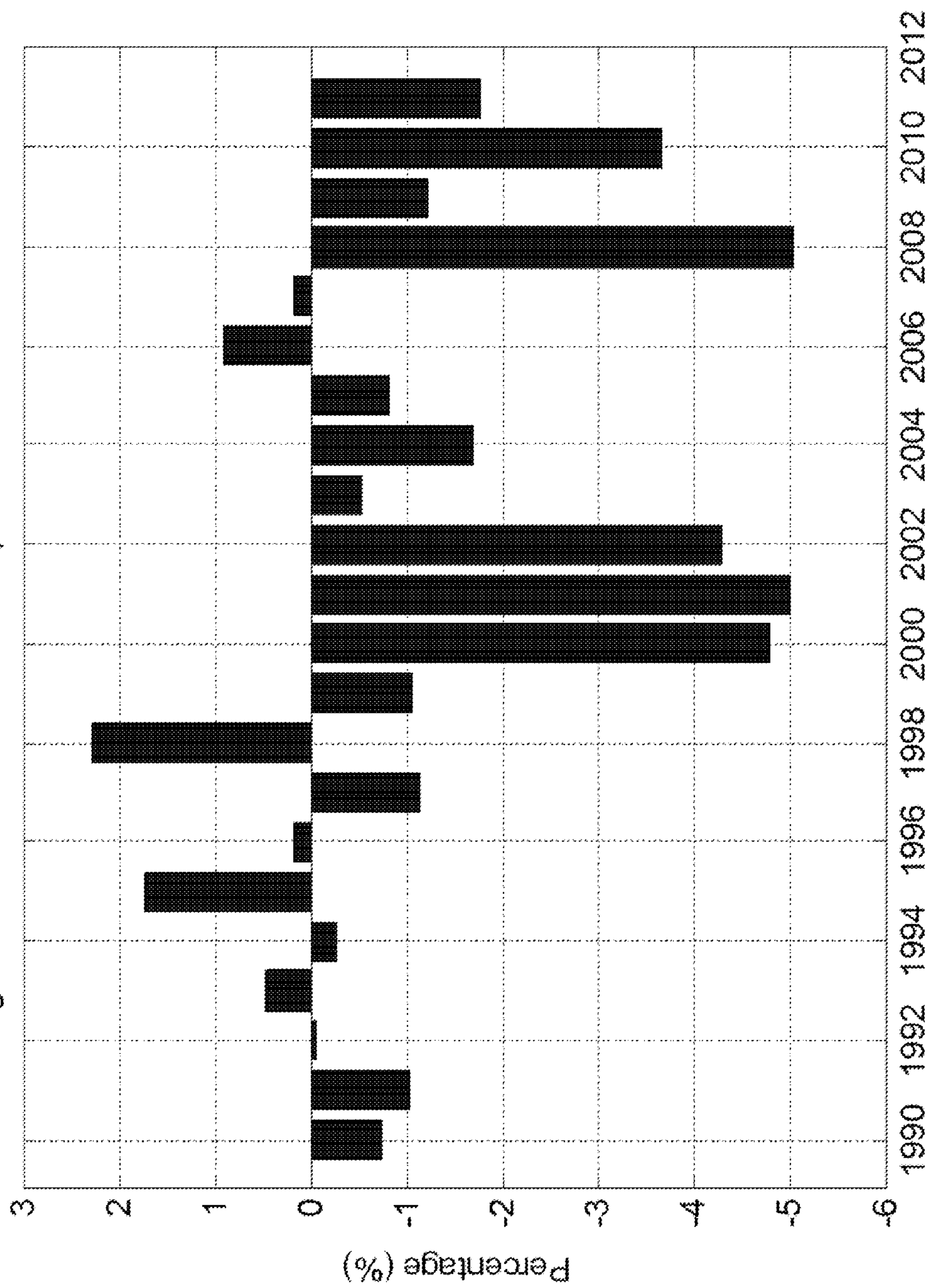
Figure 4. Total Returns of the Implied Preference Model

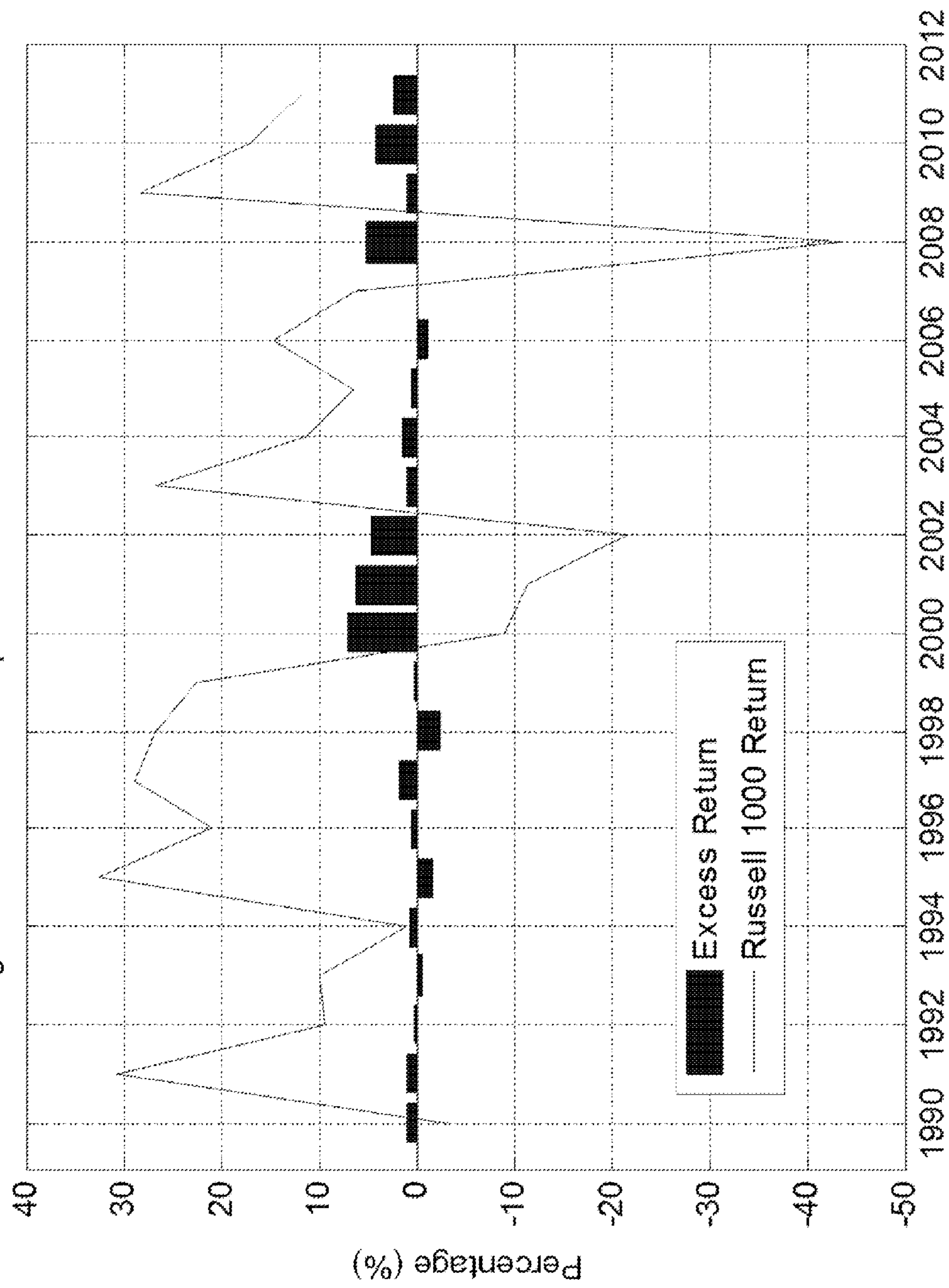
Figure 5. A rule-based portfolio and the Russell 1000
Percentage (%)
40
30
20
10
0
-10
-20
-30
-40
-50
1990
1992
1994
1996
1998
2000
2002
2004
2006
2008
2010
2012
Excess Return
Russell 1000 Return

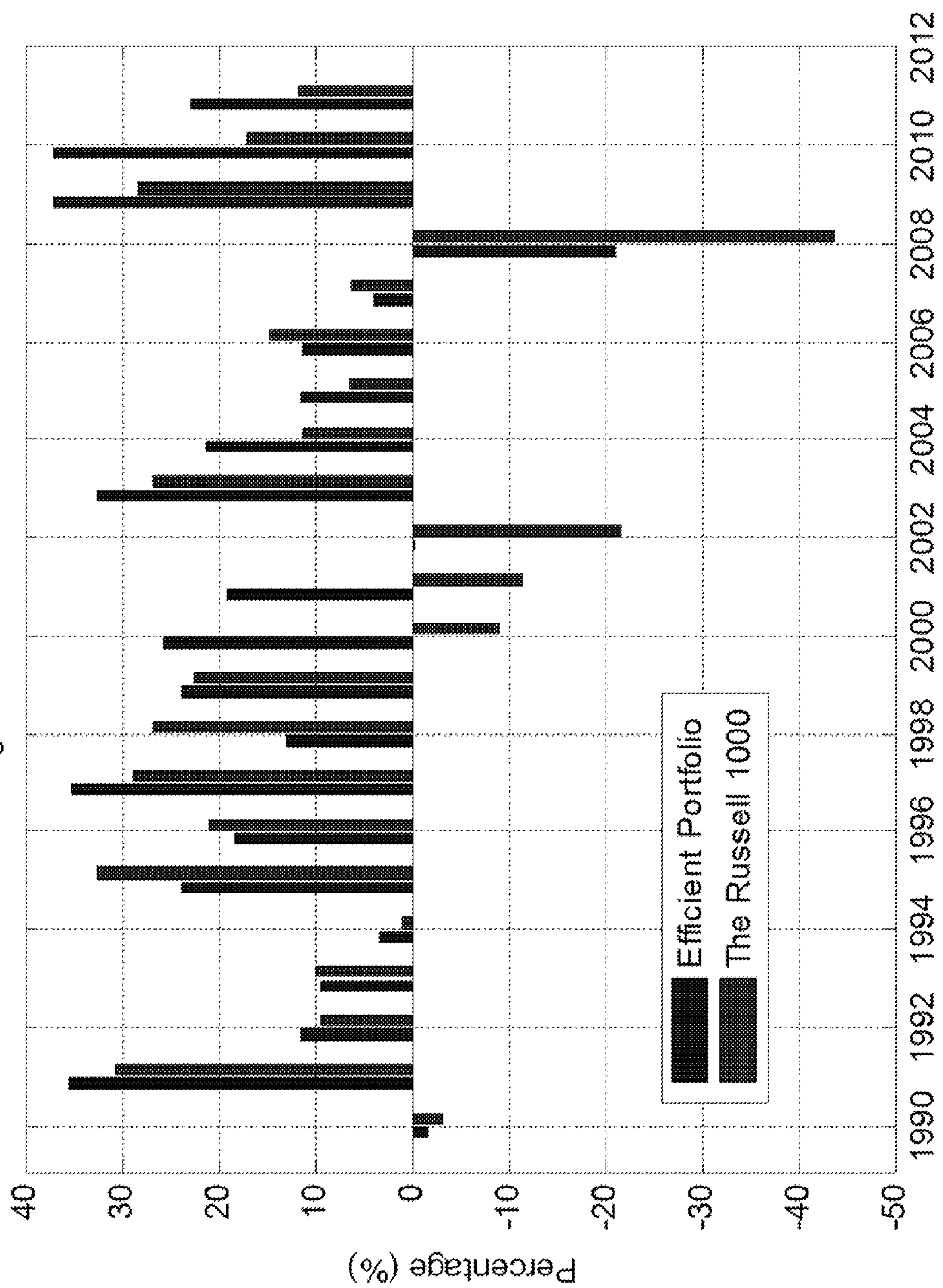
Figure 6. Total Returns
Efficient Portfolio
The Russell 1000
Percentage (%)
40
30
20
10
0
-10
-20
-30
-40
-50
1990
1992
1994
1996
1998
2000
2002
2004
2006
2008
2010
2012

SYSTEM AND METHOD FOR AN IMPLIED ALPHA MODEL AND INVESTOR PREFERENCES

BACKGROUND OF THE INVENTION

1. Field of the Invention

The instant invention relates generally to a group of computer-based methods preferably utilized with an implied alpha model, which can be treated as a preference aggregation when its factors represent investors' preferences on their portfolio.

2. Background of the Invention

Investors often favor or disfavor certain characteristics of their portfolios. For instance, investors may prefer high dividend payout stocks, short duration bonds, emerge market currencies, among other items. As such, an investor's preferences may impose a drag on the performance of their portfolios, resulting in what may be called a preference drag problem or simply a drag problem.

Investors will normally receive a reduced profit, or even lose money when a drag problem exists in their portfolio. For example, investors may favor stocks issued by large firms in a general case, stocks issued by high sales firms during a business boom, high dividend payout stocks in a low interest rate environment, or stocks issued by low debt firms during a recession. According to our study, these preferences cost investors approximately 1.24% annually if they invested in the Russell 1000 from 1990 to 2011. Put another way, investors made an average of 1.24 million dollars less each year if they were investing 100 million dollars in the Russell 1000 from 1990 to 2011.

SUMMARY OF THE INVENTION

The instant invention, as illustrated herein, is clearly not anticipated, rendered obvious, or even present in any of the prior art mechanisms, either alone or in any combination thereof.

The instant invention comprises a computer-based method to address and detect a preference drag problem in an investor's portfolio. In one embodiment, the computer-based method begins with an implied alpha model, which is derived from an existing portfolio. An implied alpha model may be treated as a preference aggregation when the alpha model's factors represent investors' preferences in the portfolio. In this embodiment, the model is also called an implied preference model.

Following the development of an implied preference model is developed from a portfolio; a drag problem may be detected by checking whether the preference model has both persistent and negative returns. If a drag problem exists in an investor's portfolio, the drag problem may be solved by modifying the portfolio under assistance from the model.

An implied preference model possesses multiple applications, including, but not limited to creating a rule-based index or an efficient portfolio from a market index. Both the rule-based index and efficient portfolio would have the same risk exposures as the market index, but a lower drawdown risk and higher returns than the market index. The rule-based index may have a low tracking error to the market index while the efficient portfolio may have a higher Sharpe ratio.

Furthermore, an implied preference model may be utilized to construct a dynamic alpha model whose weights or factors are adjusted according to a predictive way. For example, a dynamic alpha model has been constructed by combining an implied preference model with Federal monetary policy, and this model has performed well over last two decades in a back test.

There has thus been outlined, rather broadly, the more important features of group of computer-based methods preferably utilized in an implied alpha model construction for investor preferences in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

FIG. 1 illustrates a flow diagram for one embodiment of the instant invention relating to a process to detect and solve a preference drag problem in an investor's portfolio.

FIG. 2 illustrates a flow diagram for a method to construct an implied alpha model utilized with the instant invention.

FIG. 3 illustrates a graph displaying Factor Weights in an implied preference model from 1990 to 2011 utilizing the Russell 1000 as a baseline.

FIG. 4 illustrates a graph displaying a time-series annual total returns in an implied preference model from 1990 to 2011 utilizing the Russell 1000 as a baseline.

FIG. 5 illustrates a graph displaying excess returns of a rule-based index model from 1990 to 2011 utilizing the Russell 1000 as a baseline.

FIG. 6 illustrates a graph displaying total returns in an efficient portfolio model from 1990 to 2011 utilizing the Russell 1000 as a baseline.

DETAILED DESCRIPTION OF THE PREFERRED EMBODIMENT

The instant invention relates to a computer-based method for detecting and addressing a preference drag problem that exists in an investor's portfolio. Initially, the method involves the construction of an implied alpha model. An alpha model is generally a linear combination of variables on firms. The variables, such as dividend payout, leverage, and etc., are used to forecast stock returns; these variables may be called alpha factors, whereas coefficients of the variables may be called factor weights. Factor weights are often assigned based on something independent from a portfolio construction.

In one embodiment, an implied alpha model may be constructed from a portfolio, wherein the alpha model's factors possess zero exposure to risk factors carried by the portfolio. The model then makes alpha and beta measurable and separable in the portfolio; moreover, the portfolio is almost efficient under forecast returns of the model[1]. An implied alpha model may also be utilized to detect and solve a preference drag problem when its alpha factors represent investor preferences on a portfolio; in this case, the alpha model is designated an implied preference model.

[1] An implied alpha model is constructed from a portion in a portfolio. The portion represents idiosyncratic risk in the portfolio. Please see FIG. 2 for a detailed explanation.

In the preferred embodiment of the instant invention, there are normally five steps to detect and solve a preference drag problem. The steps may be designated as (1) preference identification, (2) factor selection, (3) model construction, (4) preference evaluation, and (5) preference modification. First, in the preference identification, the system considers which preferences may contribute to a drag problem; as a result of investors possessing different preferences under different market conditions and expectations, it may be better for the system to combine preferences in a group so that the group may impose a drag on portfolio performance under all market conditions and expectations.

Next, in the factor selection, the system selects a factor to represent each investor preference identified in the first step. Following the factor selection, in the model construction, the system constructs an implied preference model with factors representing investor preferences.

In the preference evaluation, the implied preference model is utilized to assess preferences on a portfolio. First, the system needs to determine if factor weights make sense with the preferences that they represent. For example, the factor of debt should have less weight during a business boom versus increasing the factor's weight during a recession. Second, the system needs to determine returns from the implied preference model; if the model shows persistent and negative returns, a preference drag problem must exist in a portfolio.

In the last step, a preference drag problem may be solved by the system by modifying investor preferences. The first and most straightforward route is for the system to remove the portion represented by the implied preference model from a portfolio. The second way is for the system to remove the portion represented by some factors in the model from a portfolio. The third is for the system to adjust factor weights to get a new model and add the portion represented by the new model to a portfolio. The fourth is for the system to take away a multiple of the portion represented by the implied preference model from a portfolio. The last way is for the system to combine some of the previous methods; a new portfolio may be constructed by one of the modifications and will have the same risk exposures as the original portfolio, however, it may show different idiosyncratic risk than the original portfolio.

FIG. 1 illustrates a system and method to detect and solve a preference drag problem in an investor's portfolio 100, wherein at step 111, the system determines which risk factors (or portfolio constraints) are needed to adjust alpha factors; risks factors are generally due to market, style, size, momentum, and industries. At step 112 the system decides which preferences in an investor's portfolio may drag on the performance of a portfolio, and then the system selects alpha factors to represent the preferences. Both steps 111 and 112 prepare the system for a derivation of an implied alpha model. At step 113, a database is provided to store a risk model, factor and security related data, and at step 114, the plurality of data from the database is loaded into a computer once the risk factors and alpha factors determined by the system are known.

At step 115, the system utilizes a plurality of embedded software to generate an implied alpha model (see FIG. 2). The model may also be designated an implied preference model since the alpha factors represent investor preferences on a portfolio. An implied preference model is shown at step 116 for examination by the system 100.

At step 117, the system determines whether factors weights make sense under preferences the factors represent, if they do not, the system 100 returns to step 112 to evaluate and/or designate different preferences or different alpha factors. At step 118, if the factor weights for the preferences are appropriate, then the system verifies whether the implied preference model has persistent and negative returns. If the model possesses persistent and negative returns, then a preference drag problem exists in the portfolio, and then at step 119, the system may solve the problem by modifying the portfolio according to the system's predefined goal. For example, if the system desires for the portfolio to be more efficient, then the system may remove the component represented by the model from the investor's portfolio. The resulting portfolio will have the same risk exposures as the original portfolio, but higher returns. However, if an implied preference model does not show persistent and negative returns, the preferences represented by the model may not impose a drag on performance of the portfolio and the system terminates at the process at step 120.

FIG. 2 illustrates one embodiment for a method of constructing an implied alpha model utilizing the software at step 115 of the system 100. Initially, at step 211, the system 100 receives at least four inputs, including, but not limited to: the first input is an existing portfolio or a reference portfolio which a position vector h denotes; the second input is a group of alpha factors which are column vectors in $\alpha$; the third input is a set of constraint position coefficients in the portfolio (the coefficients are expressed as row vectors in A and they can be such as security betas for matching exposures to market, investment styles, industries, and etc.); the last input is a risk model, wherein an invertible covariance matrix $\Sigma$ is simply used to represent a risk model. Therefore, as shown in step 211, the system 100 does not need parameters or expected returns as required inputs; the only inputs are related to portfolio positions and constraints, alpha factors, and a risk model. At step 212, the system 100 adjusts the alpha factors through the portfolio constraints.

Geometrically, a risk-adjusted alpha factor is the difference between the alpha factor and its projection onto constraint coefficient vectors under an inner product. The inner product of two vectors is defined as a multiple of a transpose of the first vector, the inverse covariance matrix, and the second vector. There are two steps in the adjustment of the alpha factors input into the system 100 at step 211. The first step is for the system 100 to determine how much portions in the alpha factors may be explained by constraints in a portfolio, or how much projections of alpha factors $\alpha$ onto row vectors in A are. The projections may be found as $A^T(A\Sigma^{-1}A^T)^{-1}A\Sigma^{-1}\alpha$ by a calculation. In the second step, risk-adjusted alpha factors are obtained by deducting the portions from alpha factors.

Mathematically, they are $$Z=\alpha-A^T(A\Sigma^{-1}A^T)^{-1}A\Sigma^{-1}\alpha=(I-A^T(A\Sigma^{-1}A^T)^{-1}A\Sigma^{-1})\alpha,$$

where I is an identity matrix.

An alpha factor is often exposed to the same risks as that of a portfolio. Therefore, the risk exposures for each alpha factor should be removed before it is used in an alpha model (i.e. a risk or constraint-adjusted alpha factor is utilized in an alpha model).

Risk exposures are explainable components of an alpha factor by portfolio constrains. In a more strict definition, risk exposures are projections from an alpha factor onto constraint coefficient vectors under an inner product. The inner product of two vectors is defined as a multiple of a transpose of the first vector, the inverse covariance matrix, and the second vector.

There are two steps to get a risk or constraint-adjusted alpha factor. First, it is decided how large risk exposures are. This step can be achieved by figuring out the projection of an alpha factor onto constraint coefficient vectors.

In the second step, a risk or constraint-adjusted alpha factor is derived as the difference between an alpha factor and its projection onto constraint coefficient vectors. Thus, a risk-adjusted alpha factor is in fact an unexplainable component of an alpha factor by portfolio constrains.

Additionally, a risk-adjusted alpha factor possesses a good property, in that it does not expose to risk inherited from a portfolio. As a result, the forecasting power of a risk-adjusted alpha factor will not be reduced by portfolio constraints. This property may be verified as follows:

$$A\Sigma^{-1}Z$$

$$=A\Sigma^{-1}(I-A^T(A\Sigma^{-1}A^T)^{-1}A\Sigma^{-1})\alpha$$

$$=A\Sigma^{-1}\alpha-A\Sigma^{-1}A^T(A\Sigma^{-1}A^T)^{-1}A\Sigma^{-1}\alpha$$

$$=A\Sigma^{-1}\alpha-A\Sigma^{-1}\alpha$$

$$=0.$$

At step 213, the system 100 undertakes a portfolio breakdown, wherein the breakdown expresses a portfolio as a linear combination of constraint coefficients (or row vectors in A) and risk-adjusted alpha factors (or column vectors in Z). The breakdown can be derived by a regression or a mathematic derivation. The following is the mathematic derivation.

Let $$h=\Sigma^{-1}A^Tx+\Sigma^{-1}Zy+\epsilon,$$

where $\epsilon$ is a residual and satisfies $A\epsilon=0$ and $Z^T\epsilon=0$, and x and y are two unknowns. $A\epsilon=0$ and $Z^T\epsilon=0$ imply that the residual has zero exposures to risk and risk-adjusted alpha factors of the portfolio. The residual has only idiosyncratic risk of the portfolio.

Alter multiplying $Z^T$ on the both side of the above equation, $$Z^Th=Z^T\Sigma^{-1}A^Tx+Z^T\Sigma^{-1}Zy+Z^T\epsilon.$$

Since $Z^T\Sigma^{-1}A^T=0$ and $Z^T\epsilon=0$, $Z^Th=Z^T\Sigma^{-1}Zy$, which implies $y=(Z^T\Sigma^{-1}Z)^{-1}Z^Th$.

Similarly, one can get $x=(A\Sigma^{-1}A^T)^{-1}Ah$ by multiplying A on the both side of the above equation. Consequently, the portfolio breakdown is derived by plugging x and y back in the equation.

A portfolio breakdown in terms of constraint coefficients and risk-adjusted alpha factors, may be described as follows:

$$h=\Sigma^{-1}A^T(A\Sigma^{-1}A^T)^{-1}Ah+\Sigma^{-1}Z(Z^T\Sigma^{-1}Z)^{-1}Z^Th+\epsilon$$

The breakdown discloses how much a portfolio may be explained by its constraints and risk-adjusted alpha factors. There are three steps to derive the breakdown. First, risk-adjusted alpha factors are obtained. Second, the portfolio is expressed as a linear combination of constraint coefficients and risk-adjusted alpha factors, (i.e. $h=\Sigma^{-1}A^Tx+\Sigma^{-1}Zy+\epsilon$), where x and y are two unknowns. Finally, the breakdown is derived by solving the unknowns using a mathematic derivation or a regression.

At step 214, the system 100 determines an implied alpha model; it is known that an implied alpha model has the form: $F=Zw$, where $\Sigma w=1$.

From the portfolio breakdown, the factor weight vector w should be a multiple of the vector: $(Z^T\Sigma^{-1}Z)^{-1}Z^Th$, that is, $$w=1/c*(Z^T\Sigma^{-1}Z)^{-1}Z^Th,$$

where c is a constant. Since the sum of factor weights is one, the constant c must be equal to $\mathrm{sum}((Z^T\Sigma^{-1}Z)^{-1}Z^Th)$. As a result, the factor weights are given in the following:

$$w=(Z^T\Sigma^{-1}Z)^{-1}Z^Th/\mathrm{sum}((Z^T\Sigma^{-1}Z)^{-1}Z^Th).$$

Additionally, the portfolio breakdown can be expressed in terms of the implied alpha model, i.e., $$h=\Sigma^{-1}A^T(A\Sigma^{-1}A^T)^{-1}Ah+c\Sigma^{-1}F+\epsilon.$$

The relationship between factor weights and portfolio positions may be expressed as follows:

$$\frac{\sqrt{\sigma_c^2-\sigma_{GMVP}^2}}{\sqrt{F^T\Sigma^{-1}F}}w=(Z^T\Sigma^{-1}Z)^{-1}Z^Th$$

including all equivalent forms.

An implied alpha model is supposed to be known the factor weights are known. Since factor weights can be uniquely determined from the above relationship, an implied alpha model can be obtained by deriving the relationship.

There are four steps to determine a relationship between factor weights and portfolio positions. First, risk-adjusted alpha factors are obtained. Second, a portfolio breakdown is derived. Third, in the breakdown, a portion, which is related to an implied alpha model, is determined. The portion is $$w=1/c*(Z^T\Sigma^{-1}Z)^{-1}Z^Th,$$

where c is a constant. In the final step, the constant c can be solved by the requirement that sum of factor weights is one. As a result, the relationship can be derived by plugging the value of the constant back to the constant in the above equation.

Finally, at step 215, it shows that the portfolio is an optimal portfolio plus a residual. Let:

$$h_c=\Sigma^{-1}A^T(A\Sigma^{-1}A^T)^{-1}Ah+c\Sigma^{-1}F,$$

$$\Sigma_c^2=h_c^T\Sigma h_c,$$

and $$\sigma_{GMVP}=\sqrt{(Ah_c)^T(A\Sigma^{-1}A^T)^{-1}(Ah_c)},$$

where $\sigma_c$ and $\sigma_{GMVP}$ correspond to volatilities of the portfolio $h_c$ and its minimum variance portfolio.

The constant c in $h_c$ can be solved as $$c=\frac{\sqrt{\sigma_c^2-\sigma_{GMVP}^2}}{\sqrt{F^T\Sigma^{-1}F}}$$

due to $$\sigma_c^2=h_c^T\Sigma h_c$$

$$=(\Sigma^{-1}A^T(A\Sigma^{-1}A^T)^{-1}Ah+c\Sigma^{-1}F)^T\Sigma(\Sigma^{-1}A^T(A\Sigma^{-1}A^T)^{-1}Ah+c\Sigma^{-1}F)$$

$$=[(Ah)^T(A\Sigma^{-1}A^T)^{-1}A\Sigma^{-1}]\Sigma[\Sigma^{-1}A^T(A\Sigma^{-1}A^T)^{-1}Ah]+[cF^T\Sigma^{-1}]\Sigma[\Sigma^{-1}A^T(A\Sigma^{-1}A^T)^{-1}Ah]+[(Ah)^T(A\Sigma^{-1}A^T)^{-1}A\Sigma^{-1}]\Sigma[c\Sigma^{-1}F]+[cF^T\Sigma^{-1}]\Sigma[c\Sigma^{-1}F]$$

$$=(Ah)^T(A\Sigma^{-1}A^T)^{-1}(Ah)+c^2(F^T\Sigma^{-1}F)$$

$$=(A(h_c+\epsilon))^T(A\Sigma^{-1}A^T)^{-1}(A(h_c+\epsilon))+c^2(F^T\Sigma^{-1}F)$$

$$=(Ah_c)^T(A\Sigma^{-1}A^T)^{-1}(Ah_c)+c^2(F^T\Sigma^{-1}F)$$

$$=\sigma_{GMVP}{}^2+c^2(F^T\Sigma^{-1}F).$$

Please note that the fourth equation and sixth equation in the above are simplified by $A\Sigma^{-1}F=A\Sigma^{-1}Zw=0$ and $A\epsilon=0$, respectively.

Therefore:

$$h_c=\Sigma^{-1}A^T(A\Sigma^{-1}A^T)^{-1}\mathrm{Ah}+\frac{\sqrt{\sigma_c^2-\sigma_{GMVP}^2}}{\sqrt{F^T\Sigma^{-1}F}}\Sigma^{-1}F,$$

which is a mean-variance optimal portfolio in terms of the implied alpha model. The optimal portfolio has the same risk exposures as the original portfolio.

The decomposition:

$$h=h_c+\varepsilon=\Sigma^{-1}A^T(A\Sigma^{-1}A^T)^{-1}\mathrm{Ah}+\frac{\sqrt{\sigma_c^2-\sigma_{GMVP}^2}}{\sqrt{F^T\Sigma^{-1}F}}\Sigma^{-1}F+\varepsilon$$

confirms that the original portfolio is an optimal portfolio plus a residual. Moreover, the original portfolio consists of three components. The first component is related to portfolio constraints:

$$\Sigma^{-1}A^T(A\Sigma^{-1}A^T)^{-1}Ah,$$

which is called a beta part. The second component includes the implied alpha model. It is $$\frac{\sqrt{\sigma_c^2-\sigma_{GMVP}^2}}{\sqrt{F^T\Sigma^{-1}F}}\Sigma^{-1}F,$$

which is called an alpha part. The last component is the residual; therefore, the original portfolio can be measured and separated by its alpha, beta, and residual. It is important to note that an implied alpha model can be modified to increase efficiency of a portfolio or to solve a preference drag problem in a portfolio.

Finally, A portfolio is almost efficient in terms of an implied alpha model, (i.e. $h=h_c+\epsilon$) where $h_c$ is an optimal portfolio in terms of an implied alpha model and $\epsilon$ is a residual.

There are five steps to show that a portfolio is almost efficient in terms of an implied alpha model. First, risk-adjusted alpha factors are obtained. Second, a portfolio breakdown is derived. Third, in the breakdown, a portion, which is related to an implied alpha model, is determined. Forth, factor weights are implied from the relationship between factor weights and portfolio positions. In the last step, a portfolio is expressed as an optimal portfolio and a residual after an implied alpha model is plugged in the breakdown obtained in second step. The optimal portfolio is efficient in terms of the implied alpha model.

In summary, the instant invention allows for a system and method that does not require any security return forecasts nor require any parameters as inputs. Furthermore, the system and methodology automatically generates an implied alpha model, which thereby makes a portfolio almost efficient. Additionally, both Alpha and risk are measurable and separable in a portfolio and the methodology is consistent with a mean-variance optimization. Finally, the system and method provide a solution used to detect and solve a preference drag problem and may be utilized to construct a rule-based market index or an efficient portfolio.

EXAMPLES

In this example, the detection of a preference drag problem in a portfolio is shown. Initially, two applications are provided to illustrate how to solve a drag problem. One application relates to a rule-based index creation while another application relates to an efficient portfolio construction.

As previously mentioned, investors favor stocks issued by large firms in a general case, stocks issued by high sales firms during a business boom, high dividend payout stocks in a low interest rate environment, or stocks issued by low debt firms during a recession. To study these preferences, four factors from firms' financial statements were selected for each firm: common equity, dividend, total debt, and sales.

The Russell 1000 was selected as a reference portfolio and the data used in the study ranged from January 1990 to June 2011. In this example, an implied preference model was constructed by the instant invention. The constructed model possesses zero exposures to risk factors which includes market, investment size and styles, momentum, and sectors. FIG. 3 illustrates that the risk-adjusted equity is only the factor with weights above 40% in all years except around 1991, and it indicates that investors usually have a preference toward large market cap stocks. The factors of debt and dividend have negative weights while the factor of sales has about 40% weights around the internet bubble in 2000. Therefore, it means that investors are less concerned with firm debt and dividend, but do care about sales around that period.

FIG. 4 illustrates time-series annual total returns of the implied preference model from January 1990 to June 2011. The model has an average return of −1.24%, which implies that the Russell 1000 annually earned 1.24% less over the period. It reveals that the Russell 1000 has a drag problem. The drag is caused by investors' preferences toward firm size, dividend, debt, and sales.

After detecting a drag problem, the system and method may solve the problem based on predefined goals. In this example, the goals are to build a rule-based index and an efficient portfolio. A rule-based index is created by removing the alpha part from the Russell 1000 (see FIG. 2 for alpha definitions). The resulting index has the same exposures to the risk factors as the Russell 1000, but lower drawdown risk and higher returns. FIG. 5 illustrates excess returns of the rule-based index over the Russell 1000. From the figure it is shown that the rule-based index has a low tracking error to the Russell 1000.

A second goal is to construct an efficient portfolio with a high Sharpe ratio; to accomplish this goal; the portfolio was built by a mean-variance optimization. In the optimization, the drag problem was overcome with the help from the implied preference model. The resulting portfolio has the same exposures to the risk factors as the Russell 1000 and its total returns are shown in FIG. 6. From the figure, it is shown that the portfolio has lower drawdown risk and higher returns than the Russell 1000.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A computerized method for generating an implied alpha model, comprising the steps of:

inputting a plurality of variables into a computerized system;

converting automatically by the computerized system a plurality of alpha factors to risk-adjusted alpha factors, wherein said converting of alpha factors comprises the steps of:

calculating automatically by the computerized system the size of each risk exposure for each risk factor;

deriving automatically a risk part from an alpha factor by the computerized system; and deducting automatically the risk part from the alpha factor by the computerized system;

producing automatically a portfolio breakdown by the computerized system, wherein said producing of the portfolio breakdown comprises the steps of:

receiving automatically the risk-adjusted alpha factors previously converted automatically by the computerized system;

displaying automatically the portfolio as a linear combination of constraint coefficients and risk-adjusted alpha factors by the computerized system; and deriving automatically the portfolio breakdown by the computerized system;

constructing automatically an implied alpha model by the computerized system; and generating automatically the portfolio as an optimal portfolio and a residual.

2. The computer-implemented method to construct an implied alpha model of claim 1, wherein the input variables are selected from the group consisting of: a position vector of a portfolio, a constraint matrix, an alpha factor matrix, and an invertible security return covariance matrix.

3. The computer-implemented method to construct an implied alpha model of claim 2, wherein the position vector represents an existing or reference portfolio.

4. The computer-implemented method to construct an implied alpha model of claim 2, wherein the constraint matrix is a set of constraint position coefficients.

5. The computer-implemented method to construct an implied alpha model of claim 2, wherein the invertible security return covariance matrix is utilized to represent a risk model.

6. The computer-implemented method to construct an implied alpha model of claim 1, wherein the system generates a relationship between factor weights and portfolio positions comprising the steps of:

obtaining risk-adjusted alpha factors by the system;

generating a portfolio breakdown by the system;

determining a portion of the breakdown; and solving by the system, a constant based on the sum of the factor weights is one.

7. The computer-implemented method to construct an implied alpha model of claim 1, wherein the system establishes that a portfolio is almost efficient in terms of implied alpha model comprising the steps of:

obtaining risk-adjusted alpha factors by the system;

generating a portfolio breakdown by the system;

determining a portion of the breakdown related to the implied alpha model;

implying factor weights by the system from the relationship between factor weights and portfolio positions; and expressing a portfolio by the system as an optimal portfolio and a residual.

* * * * *